United States Patent [19]

Kraina

[11] 4,071,009  
[45] Jan. 31, 1978

[54] COMBINED NOISE SUPPRESSING AND AIR FLOW GUIDE ENCLOSURE FOR ENGINES

[75] Inventor: Jack H. Kraina, Aurora, Ill.

[73] Assignee: Caterpillar Tractor Co., Peoria, Ill.

[21] Appl. No.: 700,274

[22] Filed: June 28, 1976

[51] Int. Cl.² ............................ F02B 77/00; F01P 1/02
[52] U.S. Cl. ................................ 123/198 E; 123/41.7; 181/204; 180/54 A
[58] Field of Search ............ 123/198 E, 195 C, 195 S, 123/41.6, 41.7, 41.79; 181/33 K, 33 GB; 180/54 A, 68 R, 69 R

[56] References Cited

U.S. PATENT DOCUMENTS

| | | | |
|---|---|---|---|
| 3,112,810 | 12/1963 | Nallinger | 123/198 E X |
| 3,147,814 | 9/1964 | Suhre | 180/54 A |
| 3,412,724 | 11/1968 | Scheiterlein et al. | 123/198 E X |
| 3,478,958 | 11/1969 | Hinck et al. | 181/33 K |
| 3,642,092 | 2/1972 | Gederbaum | 181/33 K |
| 3,762,489 | 10/1973 | Proksch et al. | 181/33 K X |
| 3,774,710 | 11/1973 | Gustavsson | 123/198 E X |
| 3,788,418 | 1/1974 | Clancy et al. | 180/68 R |
| 3,882,951 | 5/1975 | Conley | 123/198 E X |
| 3,897,850 | 8/1975 | Thompson et al. | 180/69 R X |
| 3,923,114 | 12/1975 | Suzuki | 180/54 A |

FOREIGN PATENT DOCUMENTS

| | | | |
|---|---|---|---|
| 873,659 | 1953 | Germany | 123/198 E |

*Primary Examiner*—Charles J. Myhre
*Assistant Examiner*—Ira S. Lazarus
*Attorney, Agent, or Firm*—Phillips, Moore, Weissenberger, Lempio & Majestic

[57] ABSTRACT

An internal combustion engine has an enclosure mounted therearound comprising an outer enclosure having a horizontally disposed hood positioned over a top of the engine and a pair of vertically disposed sidewalls positioned on either side thereof. An inner enclosure, disposed within the outer enclosure, comprises a horizontally disposed upper wall which is spaced vertically between the top of the engine and the hood to define first and second airflow passages therewith, the second airflow passage being further defined in part by the sidewalls. The inner enclosure further comprises a vertically disposed forward wall positioned adjacent to the front of the engine. An airflow guide means is secured internally on each of the sidewalls to define a passage therebetween which communicates with the second airflow passage defined about the engine. A first outlet means is defined rearwardly on each of the sidewalls to communicate airflow from the first airflow passage to ambient whereas a second outlet is defined at the bottom of the enclosure and beneath the engine for communicating the second airflow passage to ambient. The hood, sidewalls and upper and forward walls of the inner enclosure each have a layer of sound absorbing material secured thereon.

19 Claims, 5 Drawing Figures

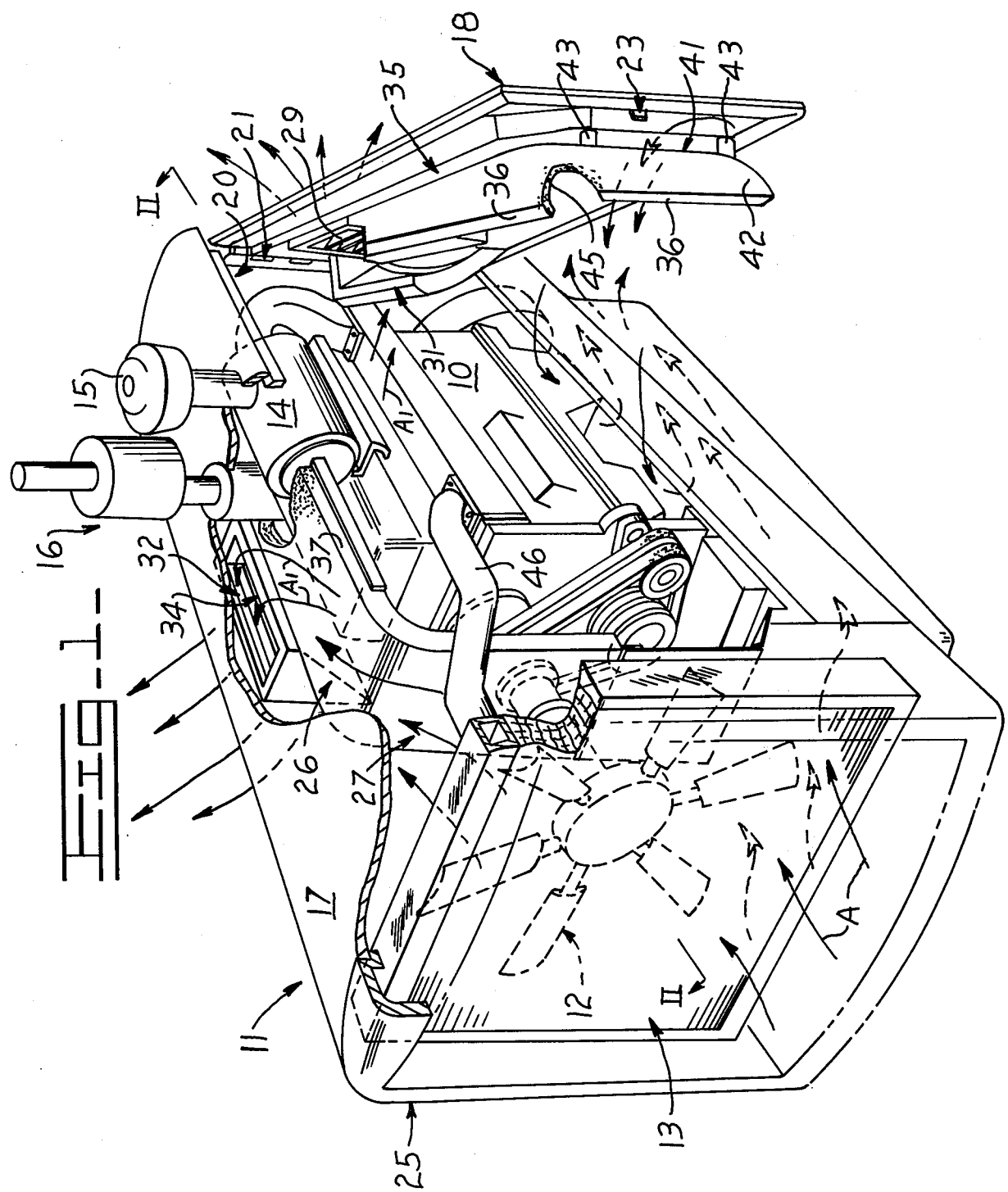

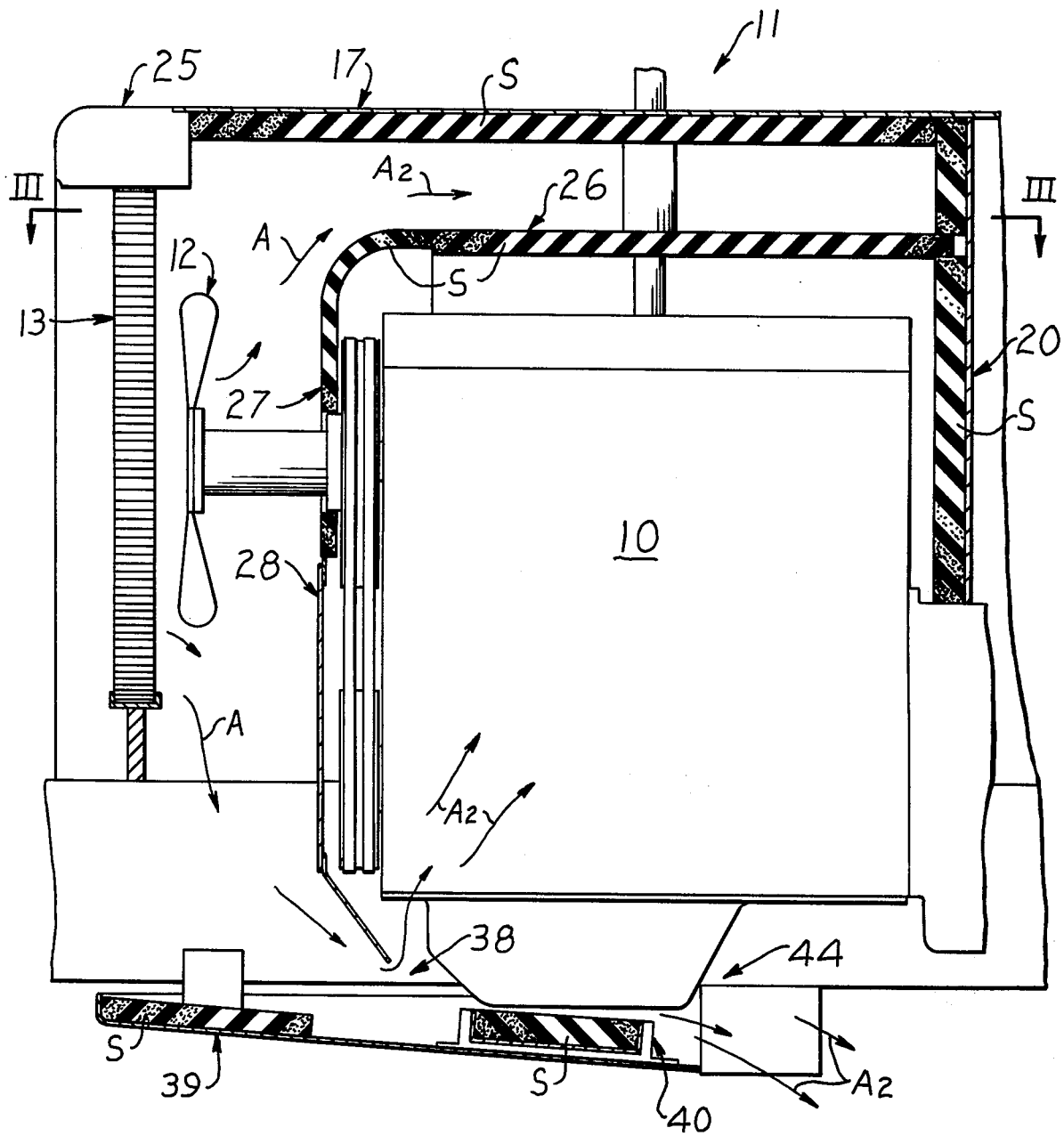

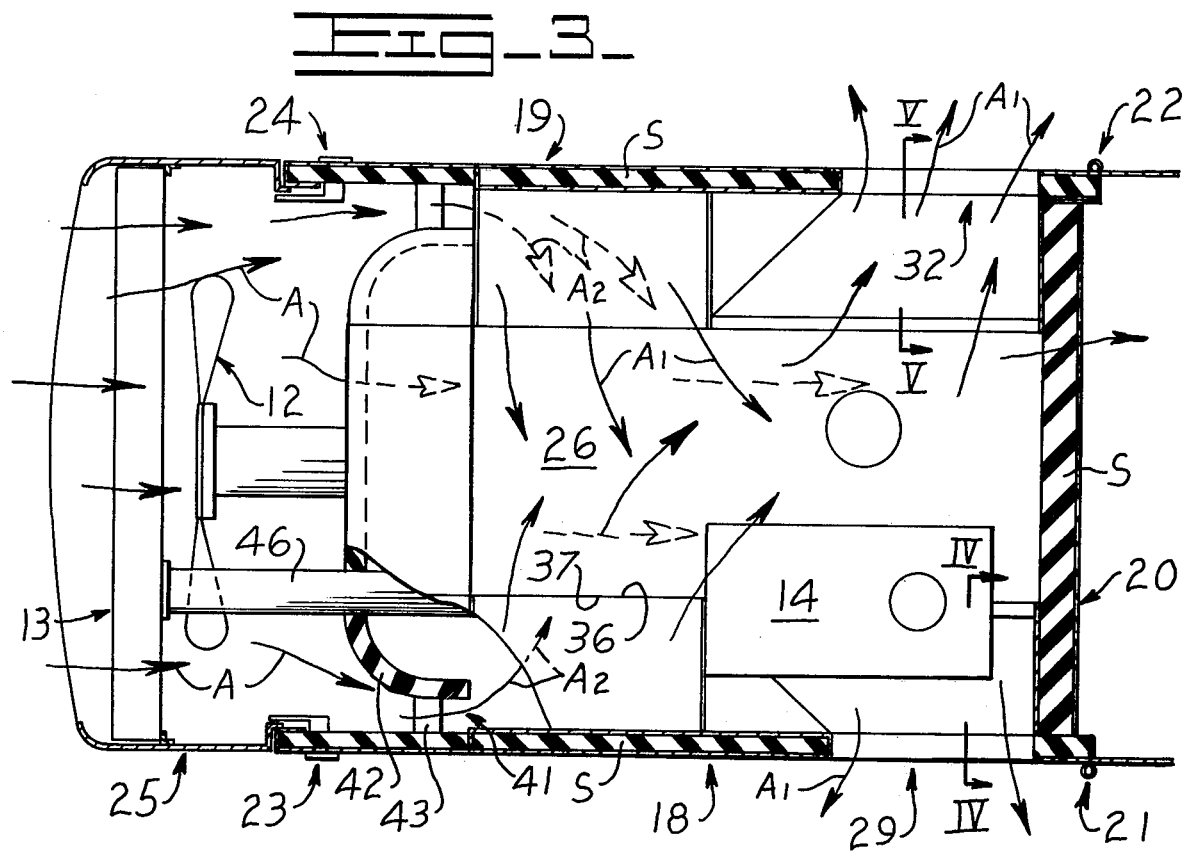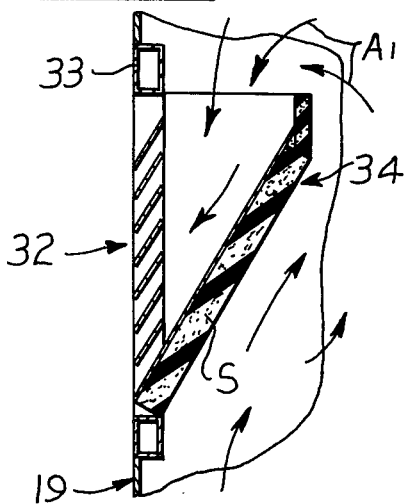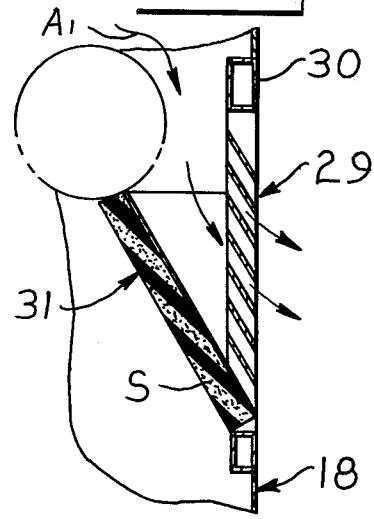

COMBINED NOISE SUPPRESSING AND AIR FLOW GUIDE ENCLOSURE FOR ENGINES

BACKGROUND OF THE INVENTION

The earthmoving industry has been particularly concerned and has expended great effort in attempting to suppress the relatively high noise levels normally generated by large diesel engines employed on earthmoving vehicles. In addition, various governmental regulations now require that the noise levels of such engines not exceed a prescribed maximum.

Numerous attempts have been made to sound-insulate such engines with sound absorbing material to thus lower noise to an acceptable level. However, such attempts have not always proved successful and have substantially increased the complexity and expense of the vehicle. In addition, the airflow patterns over the engine are oftentimes adversely affected, resulting in a loss in engine cooling efficiency.

SUMMARY OF THIS INVENTION

An object of this invention is to provide an economical and non-complex enclosure for an internal combustion engine which effectively suppresses noise levels and also provides an efficient airflow guide for directing airflow over the engine for cooling purposes. The airflow guide feature also functions to "break-up" such airflow to aid in the noise suppressing desiderata.

The enclosure means comprises an outer enclosure means including a horizontally disposed hood positioned over the top of the engine and a pair of vertically disposed sidewalls positioned on either side of the engine. An inner enclosure means, disposed within the outer enclosure means comprises a horizontally disposed upper wall positioned between the hood and the top of the engine to define a first airflow passage between the hood and the upper wall and to further define, along with the sidewalls of the outer enclosure, a second airflow passage about the top and sides of the engine.

A curved airflow guide means is preferably secured internally one each of the sidewalls to communicate air to the second airflow passage whereafter it flows over the engine and to ambient via an outlet formed on the enclosure, below the engine. A further outlet is defined in each of the sidewalls to communicate the first airflow passage with ambient. A layer of sound absorbing material is secured on a number of structural components of the enclosure, including its hood and sidewalls and the upper wall of the inner enclosure means.

BRIEF DESCRIPTION OF THE DRAWINGS

Other objects of this invention will become apparent from the following description and accompanying drawings wherein:

FIG. 1 is a front perspective view of an engine having the enclosure of this invention mounted in surrounding relationship therearound;

FIG. 2 is a longitudinal cross sectional view of the enclosure in elevation; FIG. 3 is a sectional view in top plan of the enclosure, generally taken in the direction of arrows III—III in FIG. 2; and FIGS. 4 and 5 are enlarged sectional view of louver arrangements, taken in the direction of arrows III—III and IV—IV in FIG. 3, respectively.

DETAILED DESCRIPTION

FIGS. 1-3 illustrate a water-cooled internal combustion engine 10 having an enclosure 11 of this invention mounted on a vehicle in substantial surrounding relationship about the engine. A fan assembly 12 is suitably mounted on the engine to be driven thereby for aiding in the pulling-in of an ambient airflow A through a radiator 13. The radiator is adapted to circulate water or other suitable coolant therethrough for engine cooling purposes.

The engine further comprises an air cleaner 14 adapted to draw ambient air in through a stand pipe, having a pre-cleaner 15 mounted thereon, for engine consumption purposes. An exhaust pipe assembly 16 is also mounted on the engine in a conventional manner to expel engine exhaust therefrom. The remaining components of the engine, preferably of the diesel type, are conventional and thus further explanation thereof is deemed unnecessary for an understanding of this invention.

The enclosure of this invention comprises an outer enclosure means including a horizontally disposed hood 17 positioned over a top of engine 10. A pair of vertically disposed sidewalls or panels 18 and 19 are positioned on either side of the engine to completely cover the same. A vertically disposed fire wall 20 is positioned adjacent to a rearward end of the engine to isolate an operator's compartment of a vehicle from the engine compartment.

Sidewalls 18 and 20 each comprise a sheet metal structure having a layer of sound absorbing material S suitably secured thereon whereas the fire wall comprises a like construction. The rearward ends of sidewalls 18 and 19 are preferably hingedly mounted on the outer enclosure by hinges 21 and 22, respectively, to provide openable doors affording ready access to the engine for servicing purposes. Standard latch mechanisms 23 and 24 are adapted to releasably attach forward ends of sidewalls 18 and 19 to a cowl 25 which forms an integral part of the outer enclosure means and also mounts radiator 13 in protected relationship therein.

The enclosure of this invention further comprises an inner enclosure means disposed within the outer enclosure and including a horizontally disposed upper wall 26 positioned in vertically spaced relationship between hood 17 and the top of engine 10. A vertically disposed forward wall 27 of the inner enclosure means is secured to the upper wall and is positioned adjacent to the front of the engine. A guard plate 28 is secured to a lower end of the forward wall to extend downwardly adjacent to the lower end of the engine, as clearly shown in FIG. 2.

As further shown in FIG. 2, upper wall 26 thus defines a pair of substantially isolated first and second airflow passages, indicated by flow arrows $A_1$ and $A_2$, respectively. As will be hereinafter more fully understood, the second airflow passage is defined about the top and sides of the engine with sidewalls 18 and 19 aiding in defining such passage, along with walls 26 and 27. It shoud be further noted that the latter two walls, as well as hood 17, each have a layer of sound absorbing material S secured thereon. Such material, which may be bonded to a perforated metallic back-up plate, may be composed of any standard sound-proofing material, such as any standard spongeous rubber or plastic based material which exhibits high acoustical energy absorption characteristics.

The air flowing through the above-described first airflow passage, as indicated by arrows $A_1$, will egress to ambient via first outlet means defined through a rearward end of each sidewall 18 and 19. As shown in FIG. 4, the outlet means defined in sidewall 18 comprises a louver 29 mounted in a frame 30 secured on the sidewall, along with a wedge-shaped through 31. The trough is suitably cut-away to partially accommodate cylindrically-shaped air cooler 14 therein when the sidewall or door is in its closed position.

Referring to FIGS. 3 and 5, the first outlet means formed through sidewall 19 comprises a louver 32 mounted in a frame 33, along with a wedge-shaped trough 34. It should be noted that each trough 31 and 34 also has a layer of sound-absorbing material S secured thereon. As will be hereinafter more fully understood, the enclosure means of this invention is further constructed to force airflows $A_1$ and $A_2$ into changing patterns and directions, as illustrated, to aid in efficient cooling and to further aid in suppressing the noise level of the engine.

As more clearly shown in FIGS. 1 and 3, each openable sidewall 18 and 19 is maintained in substantial sealing contact with respect to walls 26 and 27 when the sidewalls are maintained in their closed positions. In particular, a member 35 is secured internally on each sidewall to define edges 36 which will abut in sealing contact with continuous outer edges 37 formed on walls 26 and 27. The sidewalls thus not only aid in defining the outer enclosure means, but also aid in defining the inner enclosure means whereby the two separate airflow paths $A_1$ and $A_2$ are precisely defined.

Airflows $A_2$ which enter the second airflow passage may ingress therein via two separate entrances. As shown in FIG. 2, the first entrance is defined at 38, between the lower end of baffle guard 28 and a belly guard 39 secured to the outer enclosure means to form an integral part thereof. It should be noted that the belly guard has a layer of sound-absorbing material S secured in a holder 40 therefor which is disposed beneath the crank case of engine 10.

As shown in FIGS. 1 and 3, the second entrance to the second airflow passage is defined at 41, between curved extension 42 of member 35 and the flat outer plate defining the perimeter of each sidewall 18 and 19. A pair of vertically disposed mounting brackets and spacers 43 secure extension 42 in spaced relationship on the sidewall. Airflow A thus flows through the airflow guide means defining passage 41 and over the top and sides of the engine through the second airflow passage. The second outlet means for communicating the second airflow passage with ambient is defined at the bottom of the enclosure means at 44 (FIG. 2) and comprises the termination of belly guard 39, adjacent to the rearward end of the crankcase of the engine. It should be further noted in FIG. 1 that a cutout 45 is formed adjacent the top and forward end of an extension 42 of member 35 to accommodate a water hose 46, connected between engine 10 and radiator 13.

As described above, sound-absorbing material S is applied to a number of the structural components of the enclosure of this invention to substantially suppress the noise level of the engine and associated accessories, such as fan 12. In addition, airflow A which ingresses into the engine enclosure via radiator 13 is forced to change directions and flow patterns, as indicated by arrows $A_1$ and $A_2$. Such changes in direction, terminating at the abrupt changes at the troughs 31 and 34 in FIGS. 4 and 5, will further aid in suppressing noise levels.

What is claimed is:

1. A combined noise suppressing and airflow guide enclosure mounted on a vehicle in substantial surrounding relationship about an engine thereof, an inlet having a radiator disposed therein forwardly of said engine and a fan rotatably mounted between said engine and said radiator for drawing air into said enclosure, said enclosure comprising outer enclosure means substantially surrounding said engine comprising a horizontally disposed hood positioned over a top of said engine and a pair of vertically disposed sidewalls positioned on either side of said engine, each of said sidewalls comprising a door movably mounted on said enclosure for exposing said engine directly and having a layer of sound-absorbing material secured internally thereon, inner enclosure means disposed in substantial isolated relationship within said outer enclosure means comprising a horizontally disposed upper wall comprising a layer of sound-absorbing material and positioned in vertically spaced relationship between said hood and the top of said engine to define a first airflow passage between said hood and said upper wall and to further define, along with said sidewalls, a second airflow passage about the top and sides of said engine and airflow guide means secured internally on each of said doors to define a passage therebetween communicating air from said radiator to said second airflow passage.

2. The enclosure of claim 1 further comprising first outlet means defined through at least one of said doors for communicating said first airflow passage exteriorly of said enclosure.

3. The enclosure of claim 2 further comprising second outlet means defined at the bottom of said enclosure and beneath said engine for communicating said second airflow passage exteriorly of said enclosure.

4. The enclosure of claim 2 wherein said first outlet means is defined through each of said doors and is disposed rearwardly thereon.

5. The enclosure of claim 1 wherein each of said sidewalls comprises a door hingedly mounted rearwardly on said outer enclosure means.

6. The enclosure of claim 1 wherein said outer enclosure means further comprises a vertically disposed fire wall positioned adjacent to a rearward end of said engine and a layer of sound absorbing material secured internally on said fire wall.

7. The enclosure of claim 1 further comprising a guard mounted forwardly on said outer enclosure means, said radiator mounted on said guard.

8. The enclosure of claim 7 wherein said inner enclosure means further comprises a vertically disposed forward wall extending downwardly from said upper wall and comprising a layer of sound-absorbing material positioned between said radiator and the forward end of said engine.

9. The enclosure of claim 8 wherein each of said sidewalls is disposed in sealing contact with outer edges of each of said outer and forward walls of said inner enclosure means.

10. The enclosure of claim 2 wherein said first outlet means comprises a frame mounted on said one sidewall and a louver mounted within said frame.

11. The enclosure of claim 10 wherein said first outlet means further comprises a wedge-shaped trough secured on said frame in communicating relationship between said first airflow passage and said louver.

12. The enclosure of claim 1 wherein said inner enclosure means further comprises a vertically disposed forward wall comprising a layer of sound-absorbing material and extending downwardly from said upper wall and closely adjacent to a front of said engine and a baffle plate secured on a lower end of said forward wall and extending downwardly to terminate adjacent to a lower end of said engine.

13. The enclosure of claim 12 wherein said outer enclosure means further comprises a generally horizontally disposed belly guard secured thereunder to underlie a portion of said engine and to define an entrance to said second airflow passage between a lower end of said baffle plate and said belly guard.

14. The enclosure of claim 13 wherein said belly guard underlies a crankcase of said engine and terminates adjacent thereto to define an outlet means communicating said second airflow passage exteriorly of said enclosure.

15. The enclosure of claim 14 further comprising a layer of sound absorbing material secured on said belly guard in underlying relationship relative to the crankcase of said engine.

16. The enclosure of claim 1 further comprising a member secured internally on each of said doors and having a curved forward portion thereon defining said airflow guide means.

17. The enclosure of claim 16 wherein said inner enclosure means further comprises a vertically disposed forward wall extending downwardly from said upper wall and positioned adjacent to a front of said engine and wherein inner edges of the member secured internally on each of said sidewalls abuts outer edges of said upper and forward walls of said inner enclosure means in substantial sealing contact therewith.

18. The enclosure of claim 17 wherein the forward portion of said member is secured in spaced relationship on a respective one of said sidewalls to define an entrance to said second airflow passage therebetween.

19. The enclosure of claim 1 wherein a layer of sound-absorbing material is secured internally on each of said hood and said sidewalls.

* * * * *